United States Patent [19]

Rauch

[11] Patent Number: 4,495,734
[45] Date of Patent: Jan. 29, 1985

[54] GRINDING ARRANGEMENT FOR CHOPPING CUTTER OF DRUM-CHOPPER MACHINE

[75] Inventor: Hans Rauch, Saulgau, Fed. Rep. of Germany

[73] Assignee: Claas Saulgau GmbH, Saulgau, Fed. Rep. of Germany

[21] Appl. No.: 442,446

[22] Filed: Nov. 17, 1982

[30] Foreign Application Priority Data

Nov. 24, 1981 [DE] Fed. Rep. of Germany ....... 3146433

[51] Int. Cl.³ ................................................ B24B 3/55
[52] U.S. Cl. ....................................... 51/249; 51/254; 76/82.1
[58] Field of Search ................. 51/246, 247, 249, 251, 51/254, 252, 56 R; 76/82, 82.1; 15/256.52, 256.53

[56] References Cited

U.S. PATENT DOCUMENTS

| | | | |
|---|---|---|---|
| 2,113,186 | 4/1938 | Vuilleumier | 51/56 R |
| 3,026,653 | 3/1962 | Zordo | 51/56 R |
| 3,748,786 | 7/1973 | Elsner | 51/249 |
| 3,999,239 | 12/1976 | Misuna | 51/56 R |

FOREIGN PATENT DOCUMENTS 2929632 4/1980 Fed. Rep. of Germany ........ 51/249

Primary Examiner—Roscoe V. Parker
Attorney, Agent, or Firm—Michael J. Striker

[57] ABSTRACT

An arrangement for grinding a chopping cutter of a drum-chopper machine has a grinding tool, a grinding carriage which carries the grinding tool and is reciprocable parallel to an axis of rotation of the chopper drum over a length of the latter, a drive for driving the grinding carriage and including a double-acting cylinder-and-piston unit with a cylinder movable parallel to the axis of a chopper drum of the machine, and a control device for reversing the direction of movement of the cylinder of the cylinder-and-piston unit and including a control valve connected with the cylinder and two abutment members located at opposite sides of the control valve, as considered in the direction of movement of the cylinder and arranged so that, when the control member meets a respective one of the abutment members, the direction of movement of the cylinder is reversed.

14 Claims, 2 Drawing Figures

GRINDING ARRANGEMENT FOR CHOPPING CUTTER OF DRUM-CHOPPER MACHINE

BACKGROUND OF THE INVENTION

The present invention relates to a grinding arrangement for a chopping cutter of drum-chopper machines.

Grinding arrangements of the above mentioned general type are known in the art. A known grinding arrangement has a grinding carriage which is reciprocable over a guiding member parallel to an axis of rotation of a chopper drum of the machine over the length of the chopper drum, and a grinding stone radially adjustably arranged on the carriage. One such known arrangement is disclosed, for example, in German Offenlegungsschrift No. 2,929,632. The reciprocating movement of the grinding carriage for a grinding process is performed in this arrangement via a hydraulic motor which is connected with a stationarily supported dragging chain drive. Hydraulic motors must, however, operate with high pressure and their utilization for automatic grinding of the chopper cutter is expensive. Moreover, the entire drive system requires considerable space which is available in self-propelled field chopping machines only to a very limited extent.

SUMMARY OF THE INVENTION

Accordingly, it is an object of the present invention to provide a grinding arrangement for chopping cutters of a drum-chopper machine which avoids the disadvantages of the prior art.

More particularly, it is an object of the present invention to provide a grinding arrangement for a chopping cutter of a drum-chopper machine, which has a structurally simple drive system for automatic reciprocating movement of a grinding carriage, which operates with low pressure, is inexpensive to manufacture, and requires only a small space.

It is also another object of the present invention to provide a grinding arrangement for a chopping cutter of a drum-chopper machine, in which a grinding stone is automatically adjusted after several reciprocating movements of the grinding carriage, in contrast to known arrangements in which adjustment of the grinding stone was performed after each reciprocating movement of the grinding carriage, which is disadvantageous for the grinding process and grinding quality of the chopping cutter.

In keeping with these objects and with others which will become apparent hereinafter, one feature of the present invention resides, briefly stated, in a grinding arrangement for a chopping cutter of a drum-chopper machine in which a drive of a grinding carriage is formed as a double-acting cylinder-and-piston unit with a cylinder movable parallel to an axis of a chopper drum and is provided with a control valve connected with the cylinder and arranged to meet each of two abutments at both its sides so as to reverse the direction of movement of the cylinder.

When the grinding arrangement is designed in accordance with the present invention, it has a simple construction, is inexpensive to manufacture and occupies a small space.

In accordance with another advantageous feature of the present invention, the cylinder of the cylinder-and-piston unit is movable on a piston rod which is mounted at both its ends in the machine housing, and the cylinder is provided at its ends with deflecting wheels around which a dragging rope or a dragging chain moves, wherein one run of the dragging member is supported between side walls of the machine housing, whereas the other run of the same is connected with the grinding carriage.

In accordance with a further advantageous feature of the present invention, at least one abutment member is formed displaceable in a direction which is parallel to the direction of movement of the cylinder of the cylinder-and-piston unit.

Finally, still a further feature of the present invention is that the displaceable abutment member is formed as a piston rod of a hydraulically, electrically or pneumatically actuating cylinder-and-piston unit.

The novel features which are considered characteristic for the invention are set forth in particular in the appended claims. The invention itself, however, both as to its construction and its method of operation, together with additional objects and advantages thereof, will be best understood from the following description of specific embodiments when read in conjunction with the accompanying drawing.

DESCRIPTION OF A PREFERRED EMBODIMENT

Figure 1:
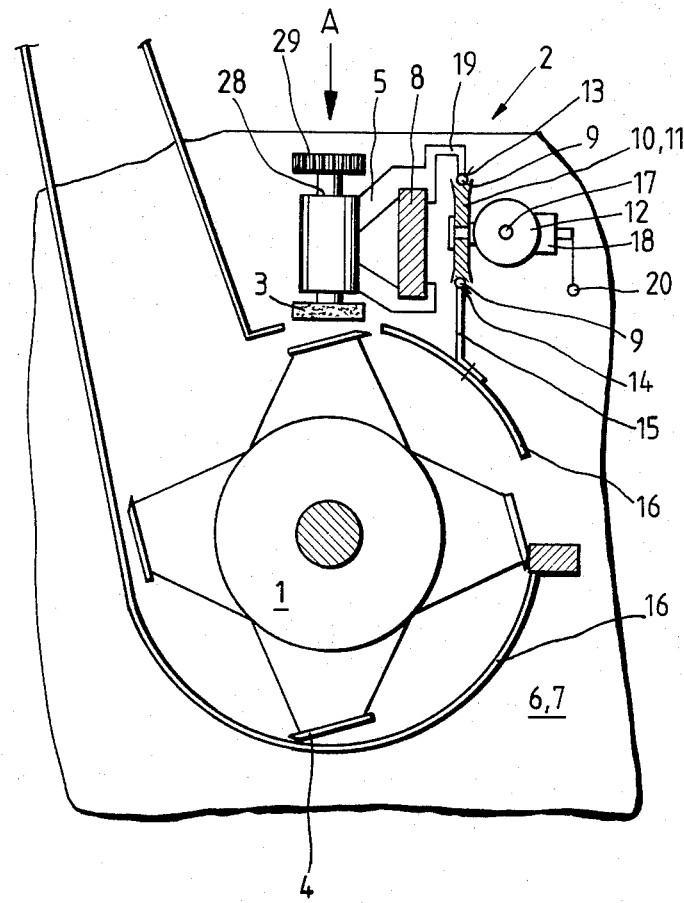
FIG. 1 is a side view of a grinding arrangement for a chopper drum of a chopper machine, in accordance with the present invention.
Figure 2:
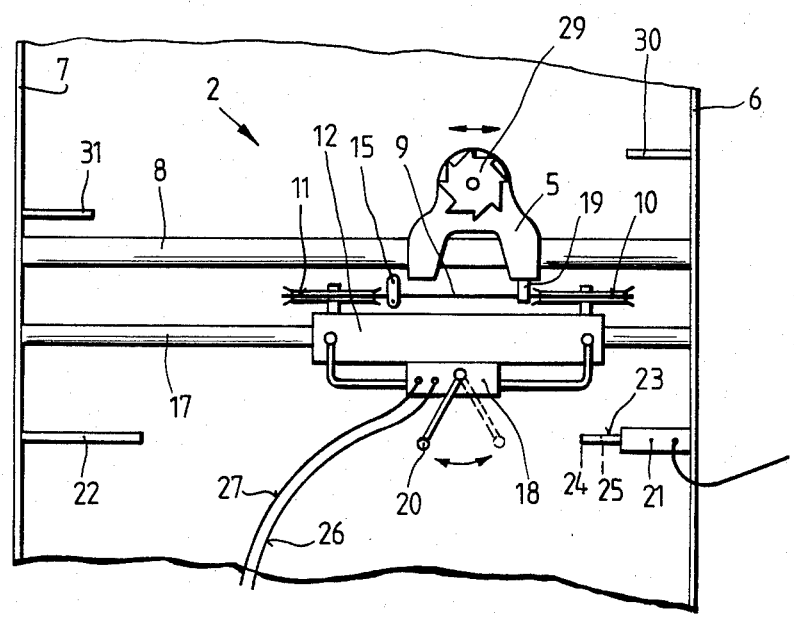
FIG. 2 is a view of the grinding arrangement as seen in direction of the arrow A in FIG. 1.

An inventive grinding arrangement is identified as a whole with reference numeral 2 and located above a chopper drum 1 of a chopper machine which is not shown in detail. The grinding arrangement 2 has a grinding stone 3 which is adjustable in direction to the chopper drum 1 and is provided for sharpening of a chopping cutter 4 during driving of the chopper drum 1.

The grinding arrangement 2 has a grinding carriage 5 which reciprocates on a guide 8 mounted between side walls 6 and 7 of a machine housing 16, along the chopping cutter 4. This reciprocation is performed via a dragging rope drive 9, 10, 11. The dragging rope drive 9, 10, 11 is composed of two deflecting wheels 10 and 11 supported on a working cylinder 12 of a double-acting hydraulic cylinder-and-piston unit. A dragging chain or rope 9 moves around the deflecting wheels 10 and 11. An upper rope run 13 of the dragging rope 9 is connected with an arm 19 of the grinding carriage 5. A lower rope run 14 of the dragging rope 9 is held via a tongue 15 on the machine housing 16 substantially centrally between its side walls 6 and 7.

The working cylinder 12 is displaceably guided on a piston rod 17 which is mounted at both its ends between the side walls 6 and 7 of the machine housing 16. The working cylinder 12 is controlled for reciprocating movement via a control valve 18 connected therewith, under the action of oil pressure. The reverse of the movement direction is performed by running of a control lever 20 provided on the control valve 18 against a respective one of abutments 21 and 22 mounted on the side walls 6 and 7 of the machine housing. The abutment 21 is formed as a hydraulically actuated cylinder-and-piston unit with a piston 23 which can move under oil pressure control from a position 24 to a position 25, and vice versa. The control valve 18 is connected via conduits 26 and 27 with an oil pressure system of the machine.

The adjustment (setting) of the grinding stone 3 is performed during the grinding process automatically via a spindle 28 and a ratchet wheel 29 connected therewith by selective running of the ratchet wheel 29 at respective sides against abutments 30 and 31 of the lateral walls 6 and 7. During each running against the respective abutment, the ratchet wheel 29 is turned by an angular displacement corresponding to half of the tooth pitch and so the grinding stone 3 is adjusted in radial direction to the chopper-drum 1.

When the piston 23 of the abutment 21 is in its position 24, the ratchet wheel 29 does not reach the abutment 30. In this position of the abutment 21, the ratchet wheel 29 turns only once during several reciprocating movements of the grinding carriage 5 against the abutment 31 by an angular distance equal to half the tooth pitch. A further adjustment is performed when the piston 23 is displaced to its position 25 and thereby the ratchet wheel 29 can also run against the abutment 30.

The abutment 21 can be controlled automatically via an electric switch clock or the like or also manually by an operator. Because of the provision of the controllable abutment 21, it is possible to reciprocate the grinding carriage 5 without adjustment of its grinding stone 3 until an adjustable value is removed from the grinding stone 3 or the cutter 4. After this, a further automatic adjustment is carried out.

It is to be understood that not only the abutment 21 but also the abutment 22 can be displaceable in direction parallel to the direction of movement of the grinding carriage and controlled automatically or manually.

It will be understood that each of the elements described above, or two or more together, may also find useful applications in other types of constructions differing from the types described above.

While the invention has been illustrated and described as embodied in a grinding arrangement for a chopping cutter of a drum-chopper machine, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

I claim:

1. An arrangement for grinding a chopping cutter of a drum-chopper machine having a chopper drum rotatable about an axis, the arrangement comprising
a grinding tool;
a grinding carriage which carries said grinding tool and is reciprocable parallel to the axis of rotation of the chopper drum over a length of the latter;
drive means for driving said grinding carriage and including a double-acting cylinder-and-piston unit with a cylinder movable parallel to the axis of rotation of the chopper drum;
control means for reversing a direction of movement of said cylinder of said cylinder-and-piston unit and including a control valve connected with said cylinder and two abutment members located at opposite sides of said control valve, as considered in the direction of movement of said cylinder, and arranged so that when said control member meets a respective one of said abutment members the direction of movement of said cylinder is reversed; and
wherein said cylinder-and-piston unit of said drive means has a piston rod, said cylinder of said cylinder-and-piston unit being guidingly movable on said piston and having two ends provided with deflecting wheels and a dragging member moving around the latter, said dragging member having one run which is fixedly supported and another run which is connected with said grinding carriage for driving the latter.

2. An arrangement as defined in claim 1, wherein the machine has a machine housing, said piston rod of said cylinder-and-piston unit having two ends mounted in the machine housing.

3. An arrangement as defined in claim 1, wherein said dragging member which moves around said deflecting wheels of said cylinder of said cylinder-and-piston unit of said drive means is formed as a dragging rope.

4. An arrangement as defined in claim 1, wherein said dragging member which moves around said deflecting wheels of said cylinder of said cyinder-and-piston unit of said drive means is formed as a dragging chain.

5. An arrangement as defined in claim 1, wherein the machine has a machine frame with side walls, and further comprising a support element arranged centrally between the side walls of the machine frame and supporting said one run of said dragging member.

6. An arrangement for grinding a chopping cutter of a drum-chopper machine having a chopper drum rotatable about an axis, the chopper drum being provided with elongated chopping cutters extending parallel to the axis of the chopper drum, a grinding carriage, guiding means supporting the grinding carriage for movement in two opposite directions over the length of the chopping cutters;
a grinding tool supported on the carriage, means for adjusting the position of the grinding tool in radial direction relative to the chopping cutters, the device comprising
drive means for driving said grinding carriage and including a double-acting cylinder-and-piston unit with a stationary piston rod extending parallel to the axis of the chopper drum, and a cylinder movable in two opposite directions on the piston rod; and
control means for reversing a direction of movement of said cylinder of said cylinder-and-piston unit and including a control valve connected with said cylinder and two stationary abutment members located at opposite sides of said control valve, as considered in the direction of movement of said cylinder, and arranged so that when said control member meets a respective one of said abutment members the direction of movement of said cylinder is reversed.

7. An arrangement as defined in claim 6, wherein the machine has a machine housing, said abutment members of said control means being mounted on the machine housing.

8. An arrangement as defined in claim 6, wherein at least one of said abutment members of said control means is displaceable in direction parallel to the direction of movement of said cylinder of said cylinder-and-piston unit of said drive means.

9. An arrangement as defined in claim 8, wherein said displaceable one abutment member of said control means is formed as a piston rod of a further cylinder-and-piston unit.

10. An arrangement as defined in claim 8 wherein said means for adjusting the position of said grinding tool is activated in response to the displacement of said at least one of said abutment members of said control means.

11. An arrangement as defined in claim 6, said drive means further including deflecting wheels mounted on said cylinder and a dragging member moving around the deflecting wheels, said dragging member having one run which is fixedly supported and another run which is connected with said grinding carriage for driving the latter.

12. An arrangement as defined in claim 11, wherein said dragging member which moves around said deflecting wheels of said cylinder of said cylinder-and-piston unit of said drive means is formed as a dragging rope.

13. An arrangement as defined in claim 11, wherein said dragging member which moves around said deflecting wheels of said cylinder of said cylinder-and-piston unit of said drive means is formed as a dragging chain.

14. An arrangement as defined in claim 11, wherein the machine has a machine frame with side walls, and further comprising a support element arranged centrally between the side walls of the machine frame and supporting said one run of said dragging member.

* * * * *